Nov. 24, 1964   A. R. GOELLNER   3,158,682
HIGH PRESSURE ELECTRICAL PROBE
Filed April 2, 1962   2 Sheets-Sheet 1

INVENTOR.
ALLAN R. GOELLNER
BY Woodling, Krost,
Granger and Rust
ATTORNEYS

Nov. 24, 1964    A. R. GOELLNER    3,158,682
HIGH PRESSURE ELECTRICAL PROBE

Filed April 2, 1962    2 Sheets-Sheet 2

INVENTOR.
ALLAN R. GOELLNER
BY Woodling, Krost,
Grenger and Rust,
ATTORNEYS

United States Patent Office

3,158,682
Patented Nov. 24, 1964

1

3,158,682
HIGH PRESSURE ELECTRICAL PROBE
Allan R. Goellner, Parma Heights, Ohio, assignor, by mesne assignments, to The Clark-Reliance Corp., Cleveland, Ohio, a corporation of Ohio
Filed Apr. 2, 1962, Ser. No. 184,379
9 Claims. (Cl. 174—151)

The invention relates in general to high pressure electrical probes and more particularly to an electrical probe to be used with pressure vessels such as steam boilers wherein the parts of the probe within the pressure vessel are subject to high temperature and pressure liquids and gases.

The use of high pressures in steam boilers and the like has increased in recent years and also the pressures have increased. Twenty-five hundred to three thousand pounds per square inch working pressures now are commonplace, and it is, of course, essential that the accessory equipment for such boilers be able to withstand such working pressures and incident temperatures of about 600 to 700 degrees F.

Electrical probes are used in steam boilers and the like to extend into a chamber to determine the water level or interface between water and steam. Where the electrical conductor of the probe is in contact only with steam, a high resistance is encountered, and when the electrical conductor of the probe is in contact with water, a relatively lower resistance is encountered. This change in electrical resistance is used to operate some alarm or signal device as an indication of the water level in the boiler or other pressure vessel.

Good ceramic insulators have been devised which are satisfactory for high voltage applications in normal room temperature and atmospheric pressures. Aluminum oxide is an example of such a ceramic insulator, but it has been found that to use a ceramic insulator of the aluminum oxide type in the high pressure and temperature applications within a steam boiler is unsatisfactory. Also many other porcelain and glass materials have been found unsatisfactory. Glass for example is found to be about half eaten away in one day at 1500 pounds per square inch of steam pressure which has a consequential temperature of about 600 degrees F.

Also steam boiler operation is such that there is not only temperature and pressure considerations to be met, but also the thermal expansion problems of one material relative to another and chemical and mechanical problems.

Accordingly, it is an object of the present invention to provide a high pressure electrical probe which may satisfactorily be used in steam pressure applications in the order of 3000 pounds per square inch.

Another object of the present invention is to provide an electrical probe having an electrical insulator body in the internal portion of the probe subjected to high temperature and pressure in which the insulator body is subjected substantially only to compression forces.

Another object of the present invention is to provide an electrical probe wherein an insulator body is sealed to metal parts of the probe by soft metal sealing means such as nickel.

Another object of the present invention is to provide an electrical probe wherein an insulator body has external conical surfaces mating with soft metal gasket washers to provide pressure tight joints.

2

Another object of the present invention is to provide an insulator body of zirconium oxide to withstand steam pressures of up to 3000 pounds per square inch.

Another object of the present invention is to provide an electrical probe assembly wherein an electrical conductor extends through a hollow metal mounting body and through a hollow insulator body and wherein pressures to which the probe is subjected provide a longitudinal force on the electrical conductor which is resisted substantially only by compression forces on the insulator body.

Other objects and a fuller understanding of this invention may be had by referring to the following description and claims, taken in conjunction with the accompanying drawings, in which:

Figure 1:
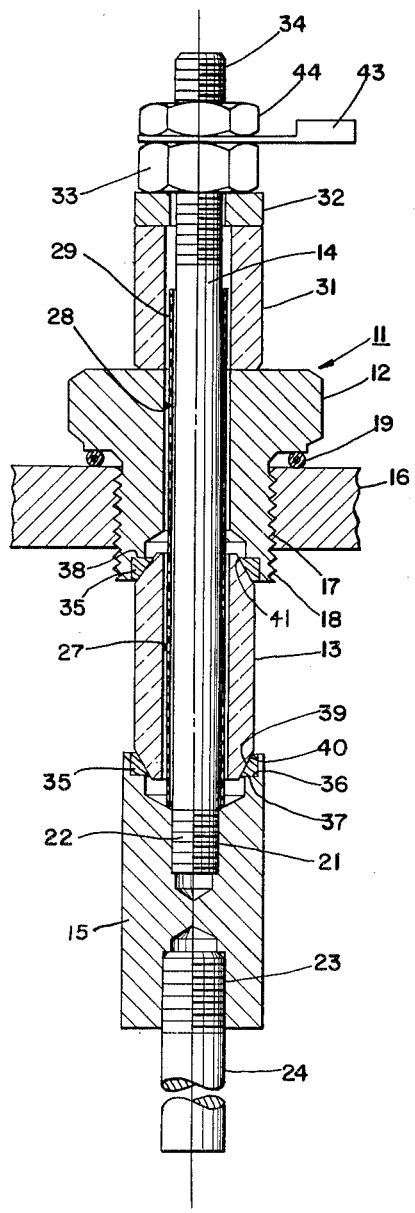
FIGURE 1 is a longitudinal sectional view of the preferred embodiment of electrical probe constructed according to the teaching of the present invention.

FIGURE 1 shows an electrical probe 11 which includes generally a metal mounting body 12, an insulator body 13, a center rod 14 and a coupling nut 15. The probe 11 is for use in a pressure vessel such as a steam boiler or the like which vessel has a wall 16. This wall has a tapped hole 17 to receive male threads 18 on the mounting body 12. This provides a means to mount the probe such that the insulator 13 is internally within the vessel 16. This metal mounting body 12 and the center rod 14 may be of any suitable material such as stainless steel or Monel metal. Monel metal is an alloy of about 67% nickel, 28% copper and 5% other elements, chiefly iron and manganese. A gasket 19 is provided between the body 12 and the vessel wall 16 to effectively seal the high pressures to which the internal portion of the probe 11 is subjected, for example, up to 3000 pounds per square inch. This gasket may take several forms, but a suitable form has been found to be an asbestos filled gasket with a Monel metal wrapping or sheath, and with this Monel metal silver plated. The silver plating provides a covering of ductile metal which may be coined against the metal body 12 and the vessel wall 16 to form a good high pressure seal.

The coupling nut 15 may be made from any suitable metal such as Monel or stainless steel. The coupling nut 15 has a tapped hole 21 to receive the threaded internal or first end 22 of the center rod 14. The coupling nut may also have another tapped hole 23 to receive an electrode extension 24 of any desired length. Where the probe 11 is mounted vertically, it is often desirable to utilize a plurality of such probes each with a different length extension 24 to obtain electrical indication of a plurality of levels of the liquid in the pressure vessel.

The center rod 14 extends through an internal bore 27 in the insulator body 13 and through an internal bore 28 in the metal body 12. An insulator sleeve 29 extends generally the full length of the center rod 14 in order to electrically insulate the center rod 14 from the mounting body 12. A suitable material for this insulator sleeve has been found to be a fluorocarbon resin. More specifically, the material may be polytetrafluoroethylene, a synthetic resinous-fluorine containing polymer or a polymer of fluorinated hydrocarbons. One such commercially available and satisfactory material is that sold by Du Pont under the trademark "Teflon." Such an insulator provides the necessary spacing function and electrical insulation between the mounting body 12 and center rod 14 despite temperatures up to 600 or 700 degrees F.

A standoff external insulator 31 is external of the vessel 16 and has an internal bore in which the center rod 14 is received and this may be of suitable material such as ceramic. Aluminum oxide is satisfactory for this standoff insulator. A washer 32 is next placed on the center rod 14 and a torque nut 33 may then be screwed on to the threaded external or second end 34 of the center rod 14.

The insulator body 13 is made from a material capable of withstanding the internal temperatures and pressures within the vessel 16. It has been found that zirconium oxide can be made gas tight and in such case is satisfactory for steam service up to 3000 pounds per square inch working pressure. It also has the required mechanical, thermal and chemical properties. A seal is required between the insulator body 13 and the mounting body 12 and between the insulator body 13 and the coupling nut 15. A soft metal gasket washer 35 such as pure annealed nickel has been found satisfactory and such gasket washers 35 are used at each end of the insulator body 13. Each gasket washer has a planar surface 36 engaging a planar surface 37 of the coupling nut 15 or a planar surface 38 of the mounting body 12. Preferably this gasket washer is brazed or silver soldered to the contiguous metal body to provide a leak-proof joint. Each gasket washer has an internal conical surface 39 to be complementary to and mate with an external conical surface 40 on the respective end of the insulator body 13. These external conical surfaces 40 may be ground on the ends of the insulator body 13. Preferably the angle of the two generally complementary conical surfaces is initially slightly different. The conical angle on the insulator body 13 may be a 57° included angle for example, and that on the gasket washer may be a 60° included angle. This initial slight difference in the two angles establishes essentially a line contact 41 at the small diameter portion of the conical surface on the gasket washers 35. During assembly of the probe 11, it is preferred that the mounting body 12, the insulator body 13, and the coupling nut 15 be assembled with the center rod screwed into the coupling nut 15. The gasket washers 35 are also previously brazed in place. Then this sub-assembly may be placed in an arbor press for example, and compressed longitudinally with a force of about 2500 pounds. This compresses and coins the annealed gasket washers 35 against the insulator body 13 to form a good seal thereat. This seal has been found to be gas tight well above the working pressure of 3000 pounds per square inch. Additionally, it has been found that this sub-assembly is locked together at these conical surfaces and stays together despite fairly rough handling after removal from the arbor press. As an additional precaution that the probe 11 may not become dis-assembled, the nut 33 may be tightened on to the washer 32 and standoff insulator 31. Torquing this nut 33 to about five foot-pounds will assure that the probe 11 will stay properly assembled and with pressure tight joints at the conical mating surfaces.

A conductor terminal 43 may be placed over the external end 34 of the center rod 15 and held in place by a nut 44.

Figure 2:
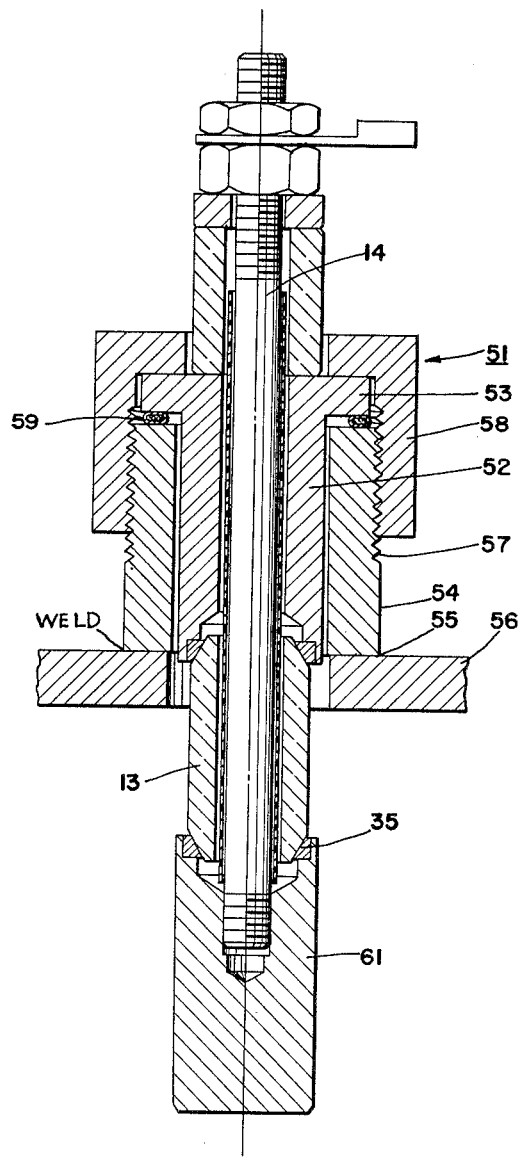
FIGURE 2 is a longitudinal sectional view of a modified form of the probe.

FIGURE 2 shows a modified probe 51 which is similar in many respects to the probe 11 of FIGURE 1. The probe 51 includes a metal body 52 having a flanged head 53. An adapter sleeve 54 may be welded at 55 to a vessel wall 56. The adapter sleeve 54 has male threads 57 thereon to receive a coupling nut 58. This coupling nut 58 engages the flanged head 53 and forces it against a gasket 59 placed between the flanged head 53 and the adapter sleeve 54. In this manner, the probe 51 is mounted to the vessel wall 56. This probe 51 has the advantage over the construction shown in FIGURE 1 by not exposing to steam any threads by which the probe 51 is mounted to the vessel wall 56. Thus, the possibility of the mounting threads being frozen or corroded in place in the vessel is eliminated.

The probe 51 of FIGURE 2 may utilize a coupling nut 61 slightly different from the coupling nut 15 of FIGURE 1. This coupling nut 61 is not provided with a double ended tapped hole, and accordingly, is intended for use without an electrode extension. Either form of coupling nut 15 or 61 may be used on either of the constructions of FIGURE 1 or 2.

Figure 3:
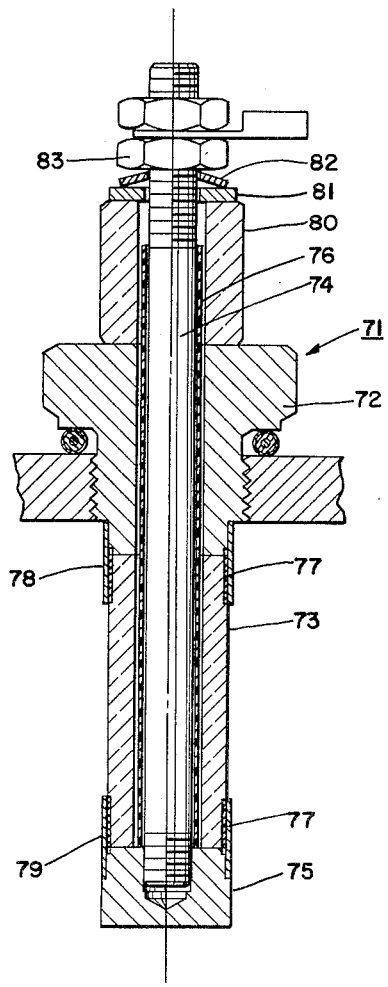
FIGURE 3 is a longitudinal sectional view of a second modification.

FIGURE 3 shows a probe 71 which includes a metal mounting body 72 similar in many respects to the mounting body 12 of FIGURE 1. It may be made from a suitable material such as Monel metal or stainless steel. An insulator body 73 is provided as is a center rod 74 and a coupling nut 75. The center rod 74 and the coupling nut 75 may be made from Monel metal or stainless steel. The insulator body 73 again is preferably made from gas tight zirconium oxide. An insulator sleeve 76 is again provided to insulate the center rod 74 from the mounting body 72.

The insulator body 73 is generally cylindrical with an annular band 77 at each end which is metalized. This may be a sprayed or evaporated metallic coating suitably bonded to the insulator body 73. Soft metal sleeves 78 and 79 are provided to establish a seal between the body 73 and the mounting body 72 and the insulator body 73 and the coupling nut 75. A suitable metal for these sleeves is pure annealed nickel. These sleeves are brazed to the respective annular metalized bands 77 and to a cylindrical surface on the contiguous metal part, namely the mounting body 72 and the coupling nut 75. Preferably, this brazing is done after the assembly of the entire probe 71 including the standoff insulator 80, washer 81, Belleville spring 82 and torque nut 83. The torque nut 83 may be torqued to about five foot-pounds for example, to place the insulator body 73 in longitudinal compression between the coupling nut 75 and mounting body 72. The brazing of the sleeves 78 and 79 to the contiguous parts establishes pressure tight joints for the internal portion of the probe 71.

The use of the conical mating surfaces in the construction of FIGURES 1 and 2 with use of the soft metal gaskets 35 establishes a good pressure tight joint. Also it has been found that this joint remains pressure tight despite fluctuations in pressure and temperature encountered in steam surface including cycling from atmospheric pressure to 3000 pounds per square inch. It will be appreciated that the insulator body 13 will have a different thermal expansion coefficient from the metal of the mounting body 13 or coupling nut 15 and also different from the coefficient of expansion of the nickel gasket 35. Nevertheless, the conical mating surfaces have been found to provide a satisfactory seal. The fact that conical mating surfaces are used in FIGURES 1 and 2 with an external conical surface on each end of the insulator body 13, means that this insulator body 13 is subjected substantially only to compression forces. During assembly there is a longitudinal compression force applied, as by an arbor press, and with this compression force maintained by the tension in the center rod 14 to assure that the probe is held together. Also the insulator body 13 at each end is subjected to a radial component of compression force. It will be observed that if a planar soft metal gasket were to be used against a planar surface, for example as in the construction of FIGURE 3 between the insulator body 73 and the mounting body 72, then as the temperature increased, the metal mounting body 72 would expand radially to cause outward radial forces to be imposed, via the gasket, on the insulator body, thereby placing it in dangerous tension. The construction of FIGURES 1 and 2 eliminates this possibility and maintains good pressure tight joints.

Also the fact that the conical angle on the gasket washer 35 and the conical angle on the insulator body 13 are initially slightly different, establishes initially a line contact 41. Then when the probe 11 is subjected to longitudinal compressional force during assembly, this line contact will have an exceedingly high pressure per unit of area, thus the nickel gasket 35 is caused to flow or coin against the external conical surface 40 of the insulator body to establish this good pressure tight joint.

By the use of a fairly steep conical angle between the gasket washer 35 and insulator body 13, the contact pressure of the gasket on the insulator body 13 is largely radial in direction, consequently, the relative differences of thermal expansion are minimized in the diametral dimension relative to the axial dimension and thus the effect of "thermal loosening" at the joints is minimized. Ceramic materials generally have poor strength in tension compared to strength in compression, and thus the present design is one which takes advantage of the good compression strength to maintain pressure tight joints.

The construction of FIGURE 3 is one which also utilizes the good compression strength of the insulator body 73. This insulator body is subjected substantially only to longitudinal compression. Changes in rate of expansion and amount of expansion of the metal mounting body 72 and the insulating body 73 for example are absorbed by the soft metal sleeve 78 and not transferred to the insulating body 73.

In the construction of all the figures, the coupling nut 15, 61 or 75 is a form of a head on the center rod, which assures that the pressure within the vessel which places a longitudinal force on the center rod 14, establishes a longitudinal force on the insulator body 13 or 73. The center rod 14 is not only a means to hold together the internal parts of the probe but is also an electrical conductor electrically connecting the coupling nut to the external terminal 43.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electrical probe for use in a pressure vessel, comprising in combination,
   a hollow insulator body,
   a hollow metal body adjacent one end of said insulator body,
   a metal head adjacent the other end of said insulator body,
   means to mount said metal body to a pressure vessel with said insulator body within the vessel,
   a soft metal washer disposed at each end of said insulator body,
   substantially complementary conical mating surfaces between said washers and the respective ends of said insulator body,
   means establishing said insulator body in compression between said metal body and said metal internal head to establish pressure-tight joints at each of said mating surfaces with the conical surfaces of said washers deformed and maintaining said insulator body in radial compression,
   an external terminal on said probe,
   and means providing an electrical connection between said metal head and said external terminal.

2. An electrical probe for use in a high pressure vessel, comprising in combination,
   a metal center rod having first and second ends,
   means providing a head on said first end,
   an insulator body having an internal bore received on said center rod with one end adjacent said center rod head,
   a metal body having an internal bore received on said center rod adjacent the other end of said insulator body,
   means to mount said metal body to a pressure vessel,
   means to insulate said center rod from said metal body,
   a soft metal washer disposed between said center rod internal head and said insulator body,
   substantially complementary conical mating surfaces between said washer and said insulator body and initially of a slightly different conical angle to establish initially essentially only a line contact,
   and means including said center rod to hold said insulator body in compression relative to said center rod internal head with said washer therebetween and with said washer deformed to establish a pressure-tight joint at said mating surfaces.

3. An electrical probe for use in a high pressure vessel, comprising in combination,
   a metal center rod,
   an insulator body having an internal bore received on said center rod,
   a metal body having an internal bore received on said center rod adjacent one end of said insulator body,
   means to mount said metal body to a pressure vessel with said insulator body within the vessel,
   means to insulate said center rod from said metal body,
   a soft metal washer disposed between said metal and insulator bodies,
   substantially complementary conical mating surfaces between said washer and the respective end of said insulator body,
   and means applying tension on said center rod relative to the combination of said metal and insulator bodies and holding said metal and insulator bodies in compression with said washer therebetween to establish a pressure-tight joint at said mating surfaces with the conical surface of said washer deformed and maintaining said insulator body in radial compression.

4. An electrical probe for use in a high pressure vessel, comprising in combination,
   a metal center rod having first and second ends,
   means providing a head on said first end,
   an insulator body having an internal bore received on said center rod with one end adjacent said center rod head,
   a metal body having an internal bore received on said center rod adjacent the other end of said insulator body,
   means to mount said metal body to a pressure vessel with said insulator body within the vessel,
   means to insulate said center rod from said metal body,
   a soft metal washer disposed at each end of said insulator body,
   substantially complementary conical mating surfaces between said washers and the respective ends of said insulator body,
   and means applying tension on said second end of said center rod relative to said metal body and holding said insulator body in compression between said metal body and said center rod internal head to establish pressure-tight joints at each of said mating surfaces with the conical surfaces of said washers deformed and maintaining said insulator body in radial compression.

5. An electrical probe for use in a vessel of high pressure in the order of 3,000 p.s.i., comprising in combination,
   a metal center rod having a headed first end and a male threaded second end,
   a zirconium dioxide elongated insulator body, a longitudinal bore in said insulator body disposed over said center rod,
a metal body,
means to mount said metal body to a vessel,
an internal bore axially through said metal body and disposed over said center rod,
means to insulate said center rod from said metal body,
first and second annular soft metal washers and disposed at the two ends of said insulator body,
a conical surface on each end of said insulator body for cooperation with a generally complementary conical mating surface on said washers,
an external insulator having an internal bore disposed over said center rod,
and a nut threaded on the second end of said center rod and holding said insulator body in compression against said metal body and said center rod head to establish pressure-tight joints at said complementary conical surfaces.

6. An electrical probe for use in a vessel of high pressure in the order of 3,000 p.s.i., comprising in combination,
a metal center rod having first and second ends with male threads on said second end and an enlarged head on said first end,
a zirconium dioxide insulator body of generally cylindrical shape,
a longitudinal bore in said insulator body disposed over said center rod,
a metal body,
means to mount said metal body to a vessel,
an internal bore axially through said metal body and disposed over said center rod,
an insulator sleeve insulating said center rod from said metal body,
an external conical surface on each end of said insulator body,
first and second annular soft metal washers each having an internal conical surface of initially a slightly different conical angle from said external conical surfaces and disposed in engagement with said external conical surfaces,
an external insulator having an internal bore of substantially the same diameter as the bore in said metal body and disposed over said center rod,
and a nut threaded on the second end of said center rod and holding said insulator body in compression against said metal body and said head on said center rod to establish pressure-tight joints at said conical surfaces.

7. An electrical probe to withstand high pressures in the order of 3,000 p.s.i., comprising in combination,
a stainless steel body,
an internal bore axially through said metal body,
external threads on said body co-axial with said bore,
a zirconium dioxide insulator body of generally cylindrical shape and having first and second ends,
a longitudinal bore in said insulator body of substantially the same diameter as said bore in said metal body,
first and second annular external conical surfaces of an included angle of about 57° at the two ends of said insulator body,
a coupling nut disposed at the second end of said insulator body,
first and second nickel washers silver solvered to said metal body and to said coupling nut, respectively,
an internal conical surface in each washer of an included angle of about 60° and disposed against said external conical surfaces,
an external insulator having an internal bore of substantially the same diameter as the bore in said metal body and aligned therewith,
an insulator sleeve disposed in the bores of said metal and insulator bodies and external insulator,
a center rod of stainless steel disposed within said insulator sleeve and having first and second ends with male threads thereon,
a tapped hole in said coupling nut,
said first end of said center rod being threaded into the tapped hole of said coupling nut,
a stainless steel washer on said center rod external to said adjacent insulator,
and a nut threaded on the second end of said center rod to place same in tension and hold said insulator body in engagement with said nickel washers in pressure-tight joints with the conical surfaces on said nickel washers deforming to seal against the slightly different conical angle of said insulator body.

8. An electrical probe to withstand high pressures in the order of 3,000 p.s.i., comprising in combination,
a metal coupling nut having a tapped hole therein,
a metal center rod having first and second ends with male threads thereon,
said first end of said center rod being threaded into the tapped hole of said coupling nut,
an insulator sleeve surrounding said center rod,
a zirconium dioxide insulator body of generally cylindrical shape and having first and second ends,
a longitudinal bore in said insulator body disposed over said insulator sleeve,
a metal body having a first end,
an internal bore axially through said metal body and disposed over said insulator sleeve,
male threads on said metal body coaxial with said bore,
first and second annular metalized bands at said first and second ends, respectively, of said insulator body,
a first nickel sleeve brazed to said first end of said metal body and brazed to said first metalized band of said insulator body,
a second nickel sleeve brazed to said coupling nut and to said second metalized band of said insulator body,
an external insulator having an internal bore of substantially the same diameter as the bore in said metal body and disposed over said center rod,
and a nut threaded on the second end of said center rod and holding said metal body in compression against said external insulator and said insulator body with said center rod being placed in tension,
said brazing of said nickel sleeves to said coupling nut and to said metal and insulator bodies establishing pressure-tight joints on the portion of said probe on the first ends of said metal body.

9. An electrical probe to withstand high pressures in the order of 3,000 p.s.i., comprising in combination, a metal body having a first end,
an internal bore axially through said metal body,
external threads on said body co-axial with said bore,
a zirconium dioxide insulator body of generally cylindrical shape and having first and second ends,
a longitudinal bore in said insulator body of substantially the same diameter as said bore in said metal body,
first and second annular metalized bands at said first and second ends, respectively, of said insulator body,
a first nickel sleeve brazed to said first end of said metal body and brazed to said first metalized band of said insulator body,
a coupling nut disposed at the second end of said insulator body,
a second nickel sleeve brazed to said coupling nut and to said second metalized band of said insulator body,
an external insulator having an internal bore of substantially the same diameter as the bore in said metal body and aligned therewith,
an insulator sleeve disposed in the bores of said metal and insulator bodies and external insulator,
a center rod of stainless steel disposed within said insulator sleeve and having first and second ends with male threads thereon,
a tapped hole in said coupling nut,
said first end of said center rod being threaded into the tapped hole of said coupling nut,
a Belleville spring on said center rod adjacent to said external insulator, and a nut threaded on said second end of said center rod and compressing said metal body against said external insulator and said insulator body with said center rod being placed in tension and compressing said Belleville spring,
said brazing of said nickel sleeves to said coupling nut and to said metal and insulator bodies establishing pressure tight joints on the portion of said probe on the first end of said metal body.

References Cited in the file of this patent

UNITED STATES PATENTS

| | | |
|---|---|---|
| 1,281,917 | Eby | Oct. 15, 1918 |
| 2,617,850 | Carmichael | Nov. 11, 1952 |
| 2,733,939 | Scherer | Feb. 7, 1956 |
| 2,962,543 | Candelise | Nov. 29, 1960 |
| 3,018,322 | Goellner | Jan. 23, 1962 |
| 3,024,300 | Martin | Mar. 6, 1962 |